No. 691,196. Patented Jan. 14, 1902.
C. R. SPENCER & L. P. WHITAKER.
TOBACCO STEMMING MACHINE.
(Application filed Sept. 26, 1901.)
(No Model.) 6 Sheets—Sheet 1.
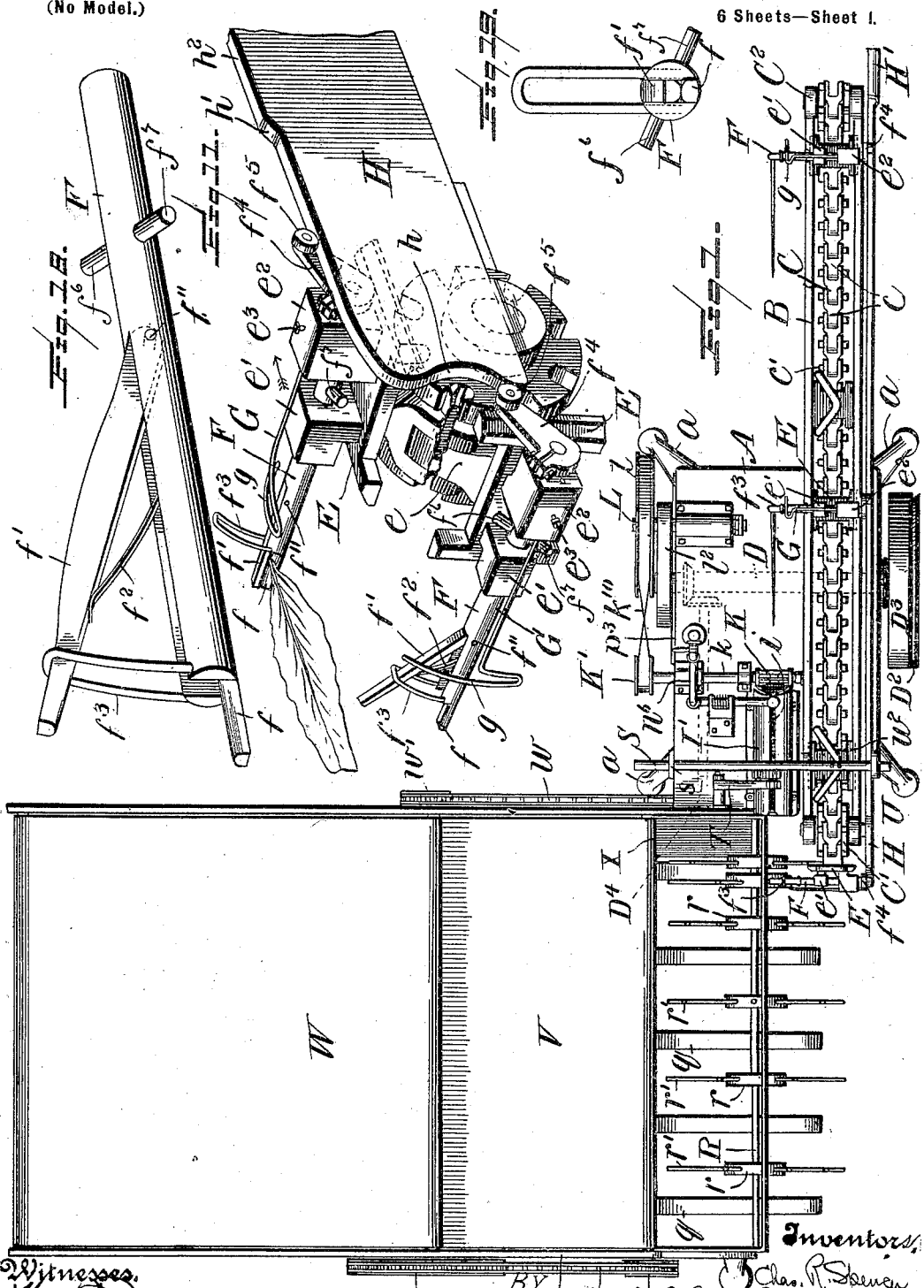

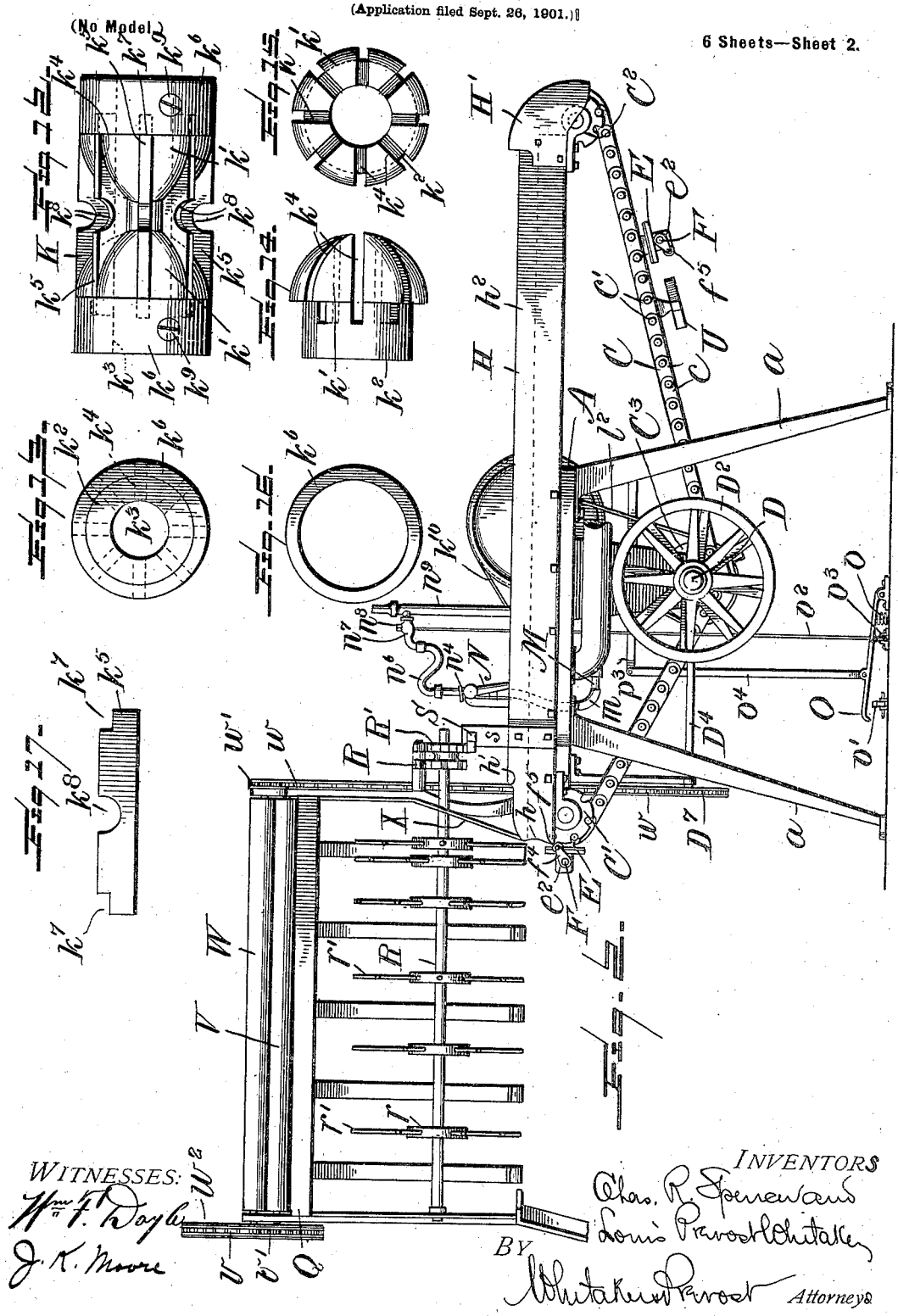

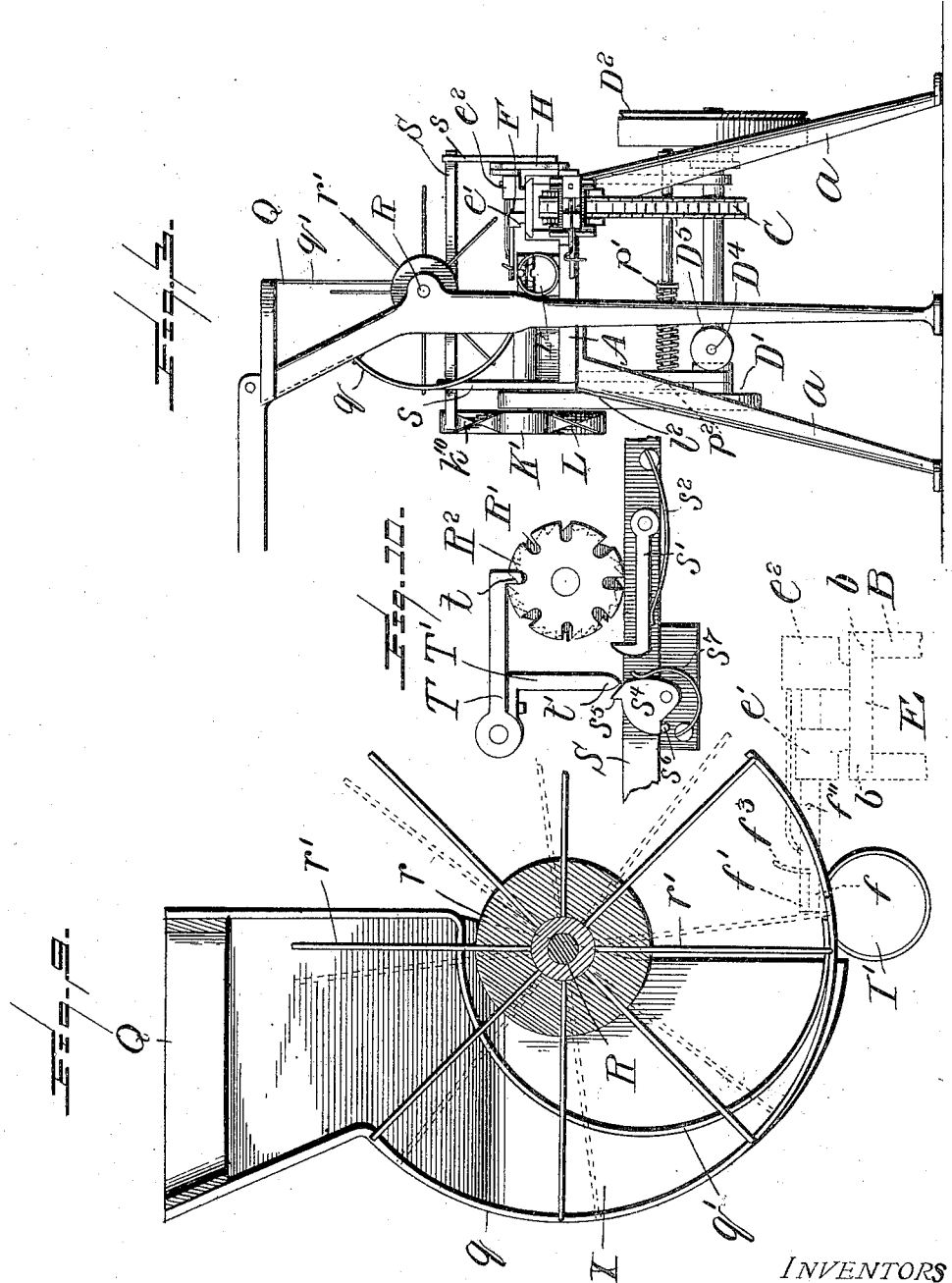

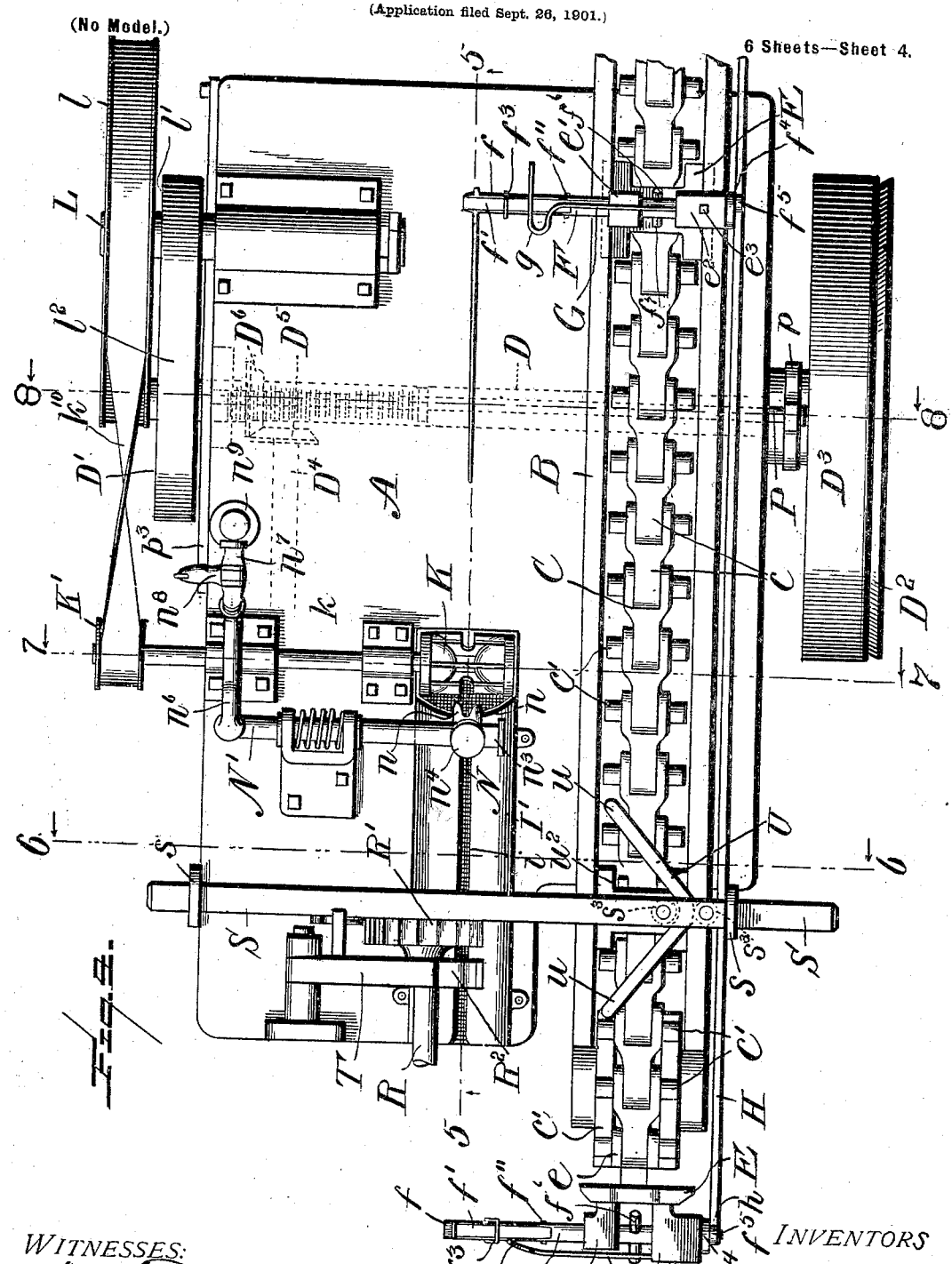

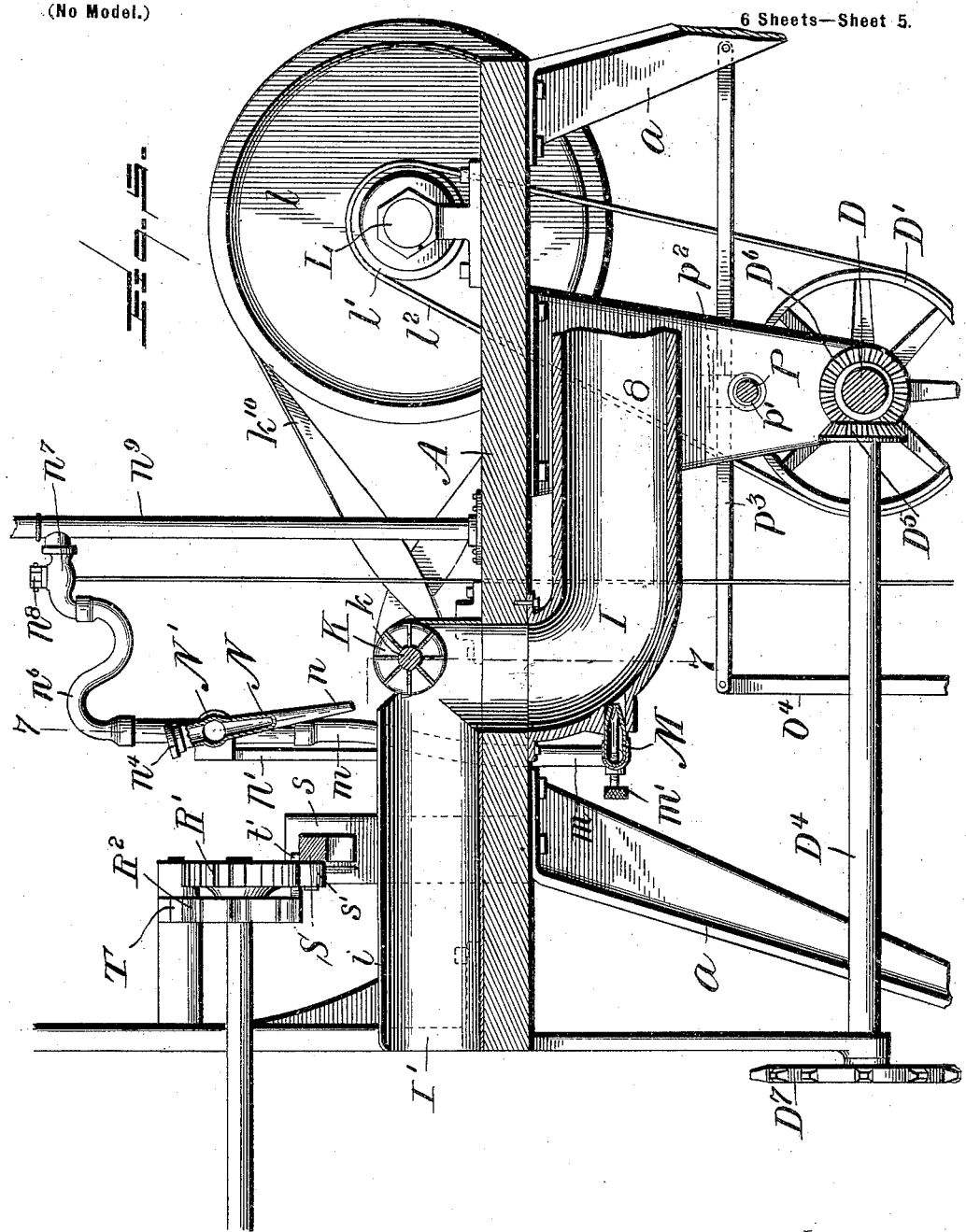

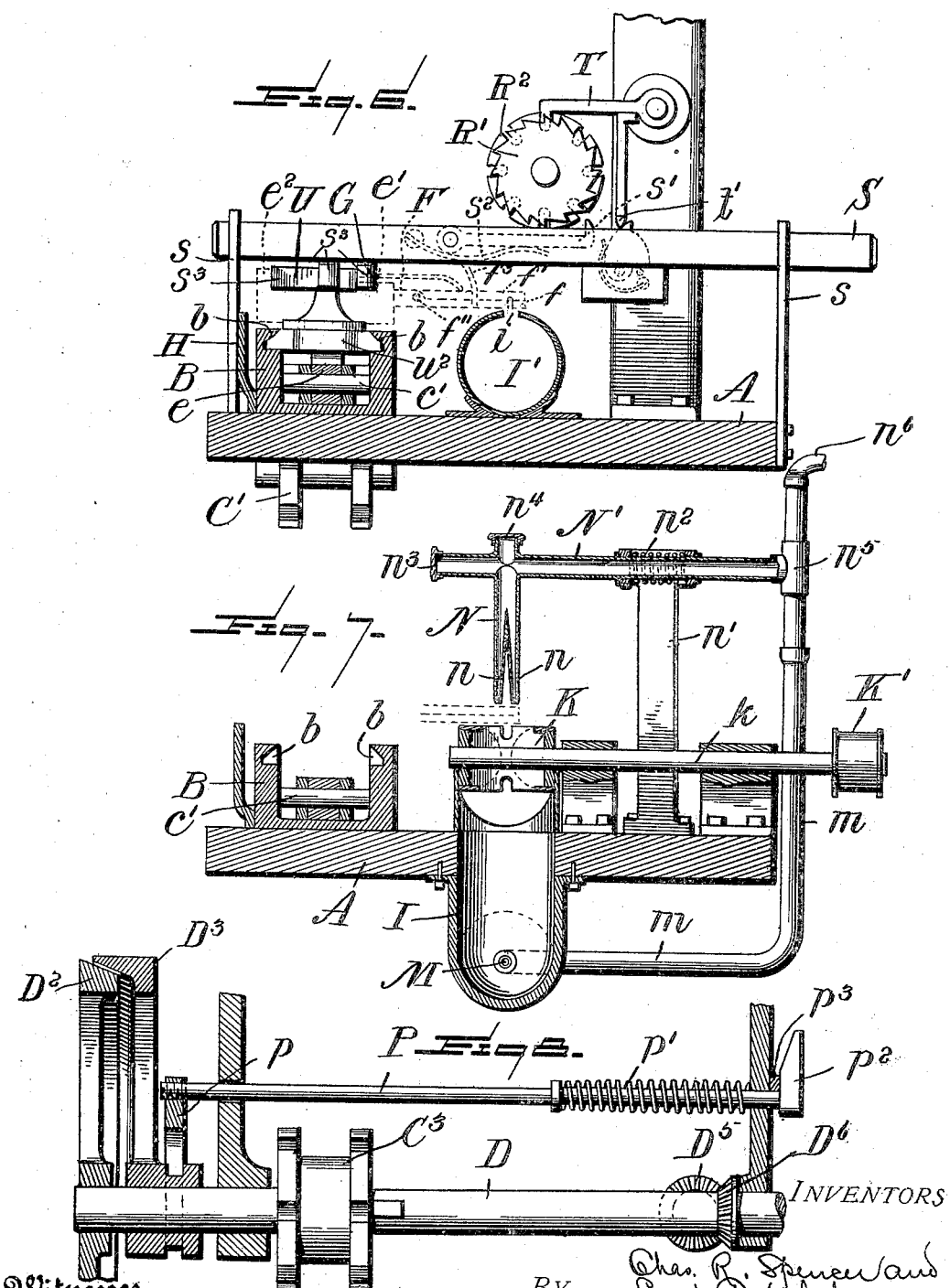

UNITED STATES PATENT OFFICE.

CHARLES R. SPENCER, OF BALTIMORE, MARYLAND, AND LOUIS P. WHITAKER, OF WASHINGTON, DISTRICT OF COLUMBIA, ASSIGNORS TO THE PNEUMATIC TOBACCO STEMMER COMPANY, OF WASHINGTON, DISTRICT OF COLUMBIA, A CORPORATION OF WEST VIRGINIA.

TOBACCO-STEMMING MACHINE.

SPECIFICATION forming part of Letters Patent No. 691,196, dated January 14, 1902.

Application filed September 26, 1901. Serial No. 76,697. (No model.)

*To all whom it may concern:*

Be it known that we, CHARLES R. SPENCER, residing at Baltimore, in the State of Maryland, and LOUIS P. WHITAKER, residing at Washington, in the District of Columbia, citizens of the United States, have invented Improvements in Tobacco-Stemming Machines, of which the following is a specification.

Our invention consists in the novel features hereinafter described, reference being had to the accompanying drawings, which illustrate one form in which we have contemplated embodying our invention, and said invention is fully disclosed in the following description and claims.

Referring to the drawings, Figure 1 is a top plan view of our improved machine. Fig. 2 is a side elevation of the same. Fig. 3 is an end view of the same. Fig. 4 is an enlarged top plan view of the main or central portion of the machine. Fig. 5 is a longitudinal vertical section on line 5 5 of Fig. 4 looking in the direction of the arrows. Fig. 6 is a transverse vertical section on line 6 6 of Fig. 4 looking in the direction of the arrows. Fig. 7 is a transverse vertical section on line 7 7 of Fig. 5. Fig. 8 is a detail sectional view of the arrangement for operating the friction driving-pulley. Fig. 9 is a transverse sectional view of the rotary feeding device. Fig. 10 is a detail view of the ratchet and spring-pawl therefor. Fig. 11 is a perspective view of one end of the chain-guide, showing a grip in open and closed position as it passes around the sprocket-wheel and engages the guide, illustrating the operation of the grip-closing cam. Fig. 12 is a view of the rotary knife or cutter. Figs. 13 to 17, inclusive, are views of details of the knife. Fig. 18 is an enlarged perspective view of one of the grips detached, showing the grip open. Fig. 19 is a front view of the same, showing the grip closed.

Referring to the drawings, A represents the table or platen of our machine supported upon suitable legs $a$. Upon the table A is supported a longitudinally-disposed chain-guide B, which is U-shaped and has the inner faces of its vertical walls provided with dovetail grooves $b\ b$. (See Fig. 7.)

C represents an endless driving-chain which lies in the chain-guide B and passes around sprocket-wheels $C'\ C^2$, mounted in bearings at each end of the guide B, and around a driving-sprocket $C^3$ on the driving-shaft D. We may, however, drive the chain from one of the sprocket-wheels $C'\ C^2$, if desired, or in any other suitable way. The chain is provided with a series of gripping devices, each comprising a cross head or block E, constructed to slide in the grooves $b\ b$ of guide B, and provided below said block with a chain member or link $e$, which forms a part of the chain. The chain is composed of separable links $c$, united by transverse pins $c'$, held against endwise movement in any suitable manner—as, for instance, by set-screws. It will be apparent, therefore, that the grip-blocks can be inserted at any desired points in the chain, that any desired number of grips may be used, and that they may be arranged at distances apart equal to the length of any desired number of links. The pins $c'$ project laterally beyond the links and engage notches in the sprocket-wheels, which are provided each with two flanges. The links of the chain pass between the flanges of the sprocket-wheels. Each grip-block E is provided on its upper side with bearing-legs $e'\ e^2$, in which is mounted the oscillating gripper-shaft F, on the outer end of which is the fixed jaw $f$ of the gripper.

$f'$ represents the movable jaw pivoted to the shaft F at $f''$ and adapted to lie in a longitudinal recess in said shaft when in closed position.

$f^2$ represents a spring for holding the movable jaw normally open, and $f^3$ represents a guiding-yoke secured to the shaft F and serving to guide the movable jaw in its opening and closing movements.

$g$ represents a curved stationary and adjustable cam, which is arranged in such position with respect to the movable jaw that when the shaft F is rotated in one direction the movable jaw will be forced into engagement with cam $g$ and closed, and when the shaft F is rotated in the opposite direction the movable jaw will be released and the spring $f^2$ will open it. The cam $g$ may, however, be arranged to both open and close the movable jaw, if desired. In this instance the cam $g$ is formed on the outer end of a spring-rod G, the other end of which is fitted into an aperture in the bearing-lug $e^2$, and said rod is held rigidly in position by a set-screw $e^3$. It will be noted that by loosening the set-screw $e^3$ and turning the rod G in its seat the position of cam $g$ can be adjusted so as to secure the desired operation of the movable jaw $f'$. The rod G being made of spring metal, the cam $g$ is permitted to yield to accommodate the variations in the thicknesses of the stems gripped between the fixed and movable jaws. The end of shaft F opposite the gripping-jaws is provided with an operating-arm $f^4$, preferably adjustably secured to the shaft F by a clamping-screw passing through a split portion of said arm and provided with a friction-roller $f^5$.

At the front end of the chain-guide B is secured what we term the "grip-closing cam" H. (Shown best in Fig. 11.) This cam is provided with an end portion $h$, which is engaged by the friction-roller $f^5$ of each grip as it comes up around the sprocket-wheel C', thereby giving a partial rotation to shaft F and closing the movable jaw. The cam-plate H is also provided on its upper face with an inclined portion $h'$, which is engaged by the roller $f^5$ of each grip and gives the shaft F thereof a further turn, thereby causing the leaf the stem of which has been seized between the gripping-jaws to be turned downward into nearly a vertical position. The cam-plate has a horizontal upper edge $h^2$, which is continued substantially the entire length of the guide B to hold up the rollers $f^5$ of the grips and prevent their opening. It is not necessary that the cam-plate H should extend in one integral piece from one end of the guide B to the other, as we may form the rear part of the plate separate and in one or more sections, all of which will be secured to the guide B or table A in any desired way. At the rear end of guide B we provide a grip-opening cam H', which is so constructed as to engage the rollers $f^5$ of the grips and depress the arms $f^4$, thereby rotating the shafts F thereof in a direction to open the grips.

The shaft F of each grip is provided with means for limiting their rotary movement in both directions for opening and closing. In this instance we have shown said shaft F provided with stop-pins $f^6$ $f^7$ for engaging portions of the grip-block between the bearings for shaft F. When the grip is open, one of these stop-pins $f^6$ will be in engagement with the block E, and as the cam $g$ is in engagement with the open jaw the grip will be held in this position until the roller $f^5$ is acted upon by the closing-cam to close the grip. When the grip closes, the stop-pin $f^7$ will prevent shaft F from being rotated too far in that direction, and the portion $h^2$ will hold the grip closed until it has passed the knife and is opened by the grip-opening cam. As a matter of fact there is little tendency of the grips to open, as the pressure of the cam $g$ on the movable jaw would afford a frictional resistance to such opening movement.

The table A is provided with a substantially central aperture, in which is fitted the stemming-tube I, extending downwardly and then rearwardly and of such length as to discharge beyond the end of the machine. This tube I is also preferably provided with a slotted guiding-tube I' forward of its vertical portion, the slot $i$ being arranged on the upper side of the tube, so as to guide the stems of the leaves to the central portion of the rotary knife.

K represents the rotary knife, mounted on a shaft $k$, supported in suitable bearings on the table A, said knife being arranged to rotate in the upper part of or directly above the stemming-tube I, as shown. The construction of the knife K is shown in detail in Figs. 12 to 17, inclusive. The knife consists of two hubs, each of which is provided with a hemispherical inner end $k'$ and a reduced outer end $k^2$. Each hub is provided with a central aperture $k^3$ and a series of radial slots $k^4$, extending entirely through the hemispherical portion and partly through the cylindrical portion, as shown in Fig. 4. $k^5$ represents flat steel blades which are fitted into the radial recesses of both hubs and are retained in place by rings $k^6$, which are slipped over the cylindrical portions of said hubs and engage notched portions $k^7$ of the blades. Each blade is provided with a central stripping-recess $k^8$, (preferably U-shaped, as shown,) which receives the stem portions of the leaves and assists in cutting the fibers and removing the flexible lateral portions of the leaves from the stems. $k^9$ $k^9$ represent set-screws passing through the hubs and rings for securing them together and also securing the knife to the knife-shaft. The shaft $k$ is provided with a driving-pulley K', which is connected by a belt $k^{10}$ to a pulley $l$ on a counter-shaft L, driven by a pulley $l'$ and belt $l^2$ from a band-pulley D' on the driving-shaft D.

M represents an injector-nozzle inserted into the stemming-tube I at a suitable point, as at the bend below the vertical portion thereof, and supplied with compressed air from a pipe $m$ for producing a strong current of air through the stemming-tube and drawing in air at the upper part thereof adjacent to the knife, forming a suction at that point. The nozzle M is provided with a regulating-valve $m'$.

N represents a nozzle arranged above the path of travel of the grips and arranged to force the leaves firmly down upon the rotary knife K, so as to press the stems thereof into the notches $k^8$ of the blades and assist in removing the lateral portions of the leaves from the stems. We prefer to provide this nozzle N with two jet-openings $n\,n$, as shown, and to arrange it pivotally, so that it can yield in case it is struck by a projecting portion of a stem to avoid danger of breaking. To this end the nozzle N is secured to a supply-tube N', mounted in bearings in a support $n'$, secured to the table A, and is provided with a spring $n^2$ to hold the nozzle N in the desired position, but permit it to yield momentarily, if necessary, to avoid straining or breaking. The tube N' is preferably provided with a removable cap or plug $n^3$, and the upper end of nozzle N is also provided with a removable cap or plug $n^4$ to enable the parts to be cleaned when desired. In this instance we have shown the pipe N provided with a T-coupling at $n^5$, to one branch of which is connected the tube $m$, (preferably a flexible tube,) which supplies air to the lower nozzle M, the other branch of the T being connected (also by a flexible tube $n^6$) with a supply of compressed air, such as a reservoir and compressor. (Not shown.) In this way compressed air can be supplied to both the nozzles M and N. The pipe $n^6$ is provided with a suitable valve, preferably provided with a spring holding it normally closed, (indicated at $n^7$ in Fig. 5,) which is supported on a standard $n^9$ and provided with an operating-lever $n^8$ and is connected with the mechanism for throwing the machine into and out of operation, so as to be operated simultaneously therewith. In this instance (see Fig. 2) we have shown a foot-lever O, pivotally mounted below the machine and provided with a lifting-spring $o$, holding it normally in raised position, and a latch $o'$ for locking it in its lowest position.

$o^2$ represents a cord, chain, or other flexible connection, one end of which is secured to the valve-lever $n^8$ and the other end passing around a stationary pulley $o^3$ and up to the lever O, where it is secured. When the lever O is in its upper position, in which it is held by its spring, the cord $o^2$ will draw down on the lever $n^8$ and hold the valve open. When the lever O is in its lowest position, the cord $o^2$ will be released and the spring-valve $n^7$ will close.

The driving-shaft D is preferably provided with a friction arrangement for starting and stopping the machine, and we have illustrated a construction which is conveniently used for the purpose. (See particularly Fig. 8.) The driving-shaft is provided with a fixed friction cone-pulley $D^2$, fitting a loose cone-pulley $D^3$, the hub of which is grooved to receive a yoke $p$, secured to a cross-rod P, mounted in the hangers for the driving-shaft and adapted to slide longitudinally therein. The rod P is provided with a spring $p'$, working against a collar on the rod, for forcing the cone-pulleys into frictional engagement, and the outer end of said rod is provided with a block $p^2$, having an inclined inner face, as shown, to receive a lever $p^3$, pivoted to the frame at one end and adapted to be forced between said block and the frame of table A to draw out rod P and separate the fixed loose cone-pulleys $D^2$ $D^3$. The loose pulley has an outer peripheral face to receive a driving-belt from line-shafting or other suitable source of power. The lever $p^3$ is connected by a link $o^4$ with the foot-lever O, as shown in Fig. 2. By pressing down on the foot-lever the lever $p^3$ will engage the block $p^2$ and separate the cone-pulleys, thus stopping the machine, and the latch $o'$ will lock the foot-lever in its lowest position. To start the machine, it is only necessary to remove the latch $o'$ with the foot, thus allowing the foot-lever to rise under the influence of its spring, thus throwing lever $p^3$ out of engagement with the block $p^2$ and allowing the spring $p'$ to throw the loose pulley $D^3$ into engagement with the fixed pulley $D^2$.

Mechanism is also provided for feeding the leaves one at a time into the grips at the point in their travel immediately before they are closed by the closing-cam. (See Figs. 1, 2, 3, and 9.)

Q represents a skeleton hopper comprising a rectangular supporting-frame provided with depending curved arms $q\,q$, located a short distance apart and designed to form supports for the leaves. In skeleton hopper and extending longitudinally thereof is an intermittently-rotating reel, which is constructed in this instance as follows:

R represents the reel-shaft mounted in bearings in the hopper Q and provided at intervals with hubs $r$, provided each with a series of radial spokes or pins $r'$, eight in number in the machine illustrated. The hubs are secured (preferably adjustably) to the shaft R and are arranged thereon so as to lie between the curved arms $q\,q$, which are curved so as to be substantially concentric with the shaft R, although this is not essential.

$q'$ represents a curved spring-arm secured to the front side of the hopper and having its lower end bearing lightly upon the supporting-arm $q$ and made very flexible. This spring-arm may be applied to one, two, or more of said arms and serves to force the leaf to follow the contour of the arms at the point of delivery therefrom into the grips. The arm or arms $q$ adjacent to the table A will be made shorter than those more removed therefrom to allow the grips to pass up into position to receive the butts of the stems from the said arms when they are pushed off of the arms and into the grips by the spokes or pins $r'$ thereof. The arms $q$, more remote from the grips, are made longer, so as to support the tail of the leaf while it is drawn out longitudinally by the grips after it has seized upon the butt of the leaf.

Mechanism is provided for imparting an intermittent rotary movement to the reel timed with the movement of the grips into position to receive a leaf, so that the leaf shall be fed into the grip while the jaws are open and the movable jaw shall be instantly closed thereon by the closing-cam, as before described. This intermittent movement may be imparted to the reel in many ways; but one arrangement for the purpose is illustrated in the drawings.

The shaft R is extended over the table A and provided with a ratchet-wheel R' and a locking notched wheel $R^2$.

S represents a slide-bar mounted in bearings $s\ s$ and disposed transversely of the chain, said bar being provided with a pawl $s'$ to engage the ratchet-wheel R' when the bar is moved in one direction, and thus rotate the reel-shaft R and reel. The pawl is held up in operative position by a spring $s^2$. (See Fig. 6.)

T represents a locking-pawl which is pivoted to a stationary part of the machine and has a head $t$, adapted to drop into the notches of the locking-wheel $R^2$ and hold the reel in the positions to which it is moved by the slide-bar S. In order to secure the proper operation of the locking-pawl T, it is necessary to lift it out of engagement with the locking-wheel $R^2$ when the slide-bar moves in the direction to cause the rotation of the ratchet-wheel R' and the reel, and the pawl T must be lifted in advance of the engagement of pawl $s'$ with the said ratchet-wheel. In Fig. 10 the mechanism for effecting this operation is shown. The pawl T is provided with an arm T', rigidly secured thereto and provided with a part $t'$, extending above the slide-bar S. The slide-bar S is provided with a pawl $s^4$, pivoted thereto and having a part $s^5$, provided with an inclined upper face extending into position to engage the part $t'$ of the arm T and raise the same when the slide-bar moves to the right in Fig. 10. The pawl is prevented from yielding during such movement of the slide-bar by a stop-pin $s^6$, and a spring $s^7$ holds the pawl normally in engagement with the pin $s^6$. On the return movement of the slide-bar S the rear or straight face of the part $s^5$ thus causes the pawl to swing on its pivot and pass under the part $t'$ of arm T, when the spring $s^7$ will restore it to operative position. Hence the pawl T is not lifted on the return movement of the slide-bar S.

In order to impart the desired reciprocation to the slide-bar S, one of the chain-links a determined distance in advance of each grip-block is provided with a winged cam U, having, preferably, two cam grades or wings $u\ u$, which engage friction-rollers $s^3\ s^3$ on the lower face of the slide-bar S and throw the slide-bar out and back in passing. This cam is so constructed as to impart the intermittent motion to the reel at the proper time, and it is to be noted that the timing is accomplished in connection with each grip. Hence the number of grips in the chain can be varied, and they can be placed at different distances apart, it being only necessary that the links carrying the cams U shall be placed at the required distance in advance of each of said grip-blocks. The links carrying cams U will also be provided with cross heads or slides $u^2$, as shown, which slide in the grooves of the guide B and insure the proper operation of the cams.

To feed the leaves to the hopper and reel, we employ, preferably, two horizontal belts. (Shown in Fig. 1.)

V represents a rapidly-moving belt adjacent to the hopper, and W represents a very slowly traveling belt delivering the leaves to the faster belt V, which in turn drops them into the hopper Q, when the pins of the reel feed them step by step until they are inserted in the grips and carried by the chain over the knife and stemming-tube, where they are subjected to the action of the compressed air. The leaf portions are severed from the stems and carried through the tube and discharged therefrom, while the stems remain in the grips until the same are opened by the opening-cams, when the stems drop out into a suitable receptacle. The belts may be driven in any desired manner. In this instance we have shown a counter-shaft $D^4$, provided with a bevel-pinion $D^5$, meshing with a similar pinion $D^6$ on the driving-shaft D. Shaft $D^4$ is also provided with a sprocket-wheel $D^7$, geared by a chain $w$ with a sprocket $w'$ on one of the rollers of belt W. Said roller is also provided with a large sprocket $w^2$ on its other end, connected by a chain $v$ with a smaller sprocket $v'$ on one of the rollers of belt V, so as to drive the belt V at greater speed than the belt W. In feeding the tobacco-leaves will be laid side by side on belt W, which by traveling slowly gives the operator time to arrange the leaves upon it. As the belt W moves the leaves are dropped singly upon the belt V and are quickly carried to the hopper Q, thereby separating them sufficiently so that two leaves will not be carried together to the reel. The hopper is provided at the end nearest the grips with an inclined vertically-disposed end plate X, which is engaged by the butts of the stems as the leaves are fed by the reel, thus adjusting the leaves longitudinally, so that they will be properly presented to the grips.

What we claim, and desire to secure by Letters Patent, is—

1. The combination with the stemming-tube, and the rotating cutter, of an endless moving carrier, a series of normally open grips carried thereby and arranged to travel over said cutter and stemming-tube, mechanism for closing said grips, and mechanism for opening said grips, substantially as described.

2. The combination with the stemming-tube, and the rotating cutter, of an endless moving carrier, a series of normally open grips carried thereby and arranged to travel over said cutter and stemming-tube, mechanism for closing said grips, and mechanism for opening said grips, a nozzle located above said cutter, and means for supplying compressed air to said nozzle, substantially as described.

3. The combination with the stemming-tube, and the rotating cutter, of an endless moving carrier, a series of normally open grips carried thereby and arranged to travel over said cutter and stemming-tube, mechanism for closing said grips, and mechanism for opening said grips, means for creating a current of air through the stemming-tube, and a compressed-air jet arranged above said cutter and tube, substantially as described.

4. The combination with the stemming-tube, and the rotating cutter, of an endless moving carrier, a series of normally open grips carried thereby and arranged to travel over said cutter and stemming-tube, mechanism for closing said grips, and mechanism for opening said grips, means for creating a current of air through the stemming-tube, a compressed-air nozzle movably mounted above said cutter in line with the stemming-tube, and a spring for holding said nozzle in its normal position, substantially as described.

5. The combination with stemming devices, of an endless carrier, a series of revolubly-mounted grips carried thereby, each provided with a fixed and a movable jaw, means for rotating each of said grips independently with respect to said carrier, and a cam for each grip secured to said carrier and adapted to be engaged by the movable jaw of the grip, substantially as described.

6. The combination with stemming devices, of an endless carrier, a series of revolubly-mounted grips carried thereby, each provided with a fixed and a movable jaw, a spring holding said movable jaw normally open, means for independently rotating said grips with respect to the carrier to open and close the same, a cam carried by the carrier adjacent to each grip and arranged to be engaged by said movable jaw when the grip is rotated, to close said movable jaw, substantially as described.

7. The combination with stemming mechanisms, of an endless movable carrier, a series of grip members revolubly mounted therein each provided with a fixed jaw, a movable jaw pivoted to each of said grip members and provided with a spring to hold it normally open, a cam secured to the carrier adjacent to each grip, and arranged to engage the movable jaw thereof to close it, when the grip member is rotated, an arm secured to each grip member, and a stationary grip-closing cam located in the path of said arms, substantially as described.

8. The combination with stemming mechanisms, of an endless movable carrier, a series of grip members revolubly mounted therein, each provided with a fixed jaw, a movable jaw pivoted to each of said grip members and provided with a spring to hold it normally open, a cam secured to the carrier adjacent to each grip and arranged to engage the movable jaw thereof to close it, when the grip member is rotated, an arm secured to each grip member, a stationary grip-closing cam located in the path of said arms and adapted to rotate said grip members in one direction and a grip-opening cam arranged in the path of said arms and adapted to rotate said grip members in the opposite direction, substantially as described.

9. The combination with stemming devices, of an endless carrier, a series of revolubly-mounted grips carried thereby, each provided with a fixed and a movable jaw, means for rotating each of said grips independently, and a cam for each grip, arranged to engage the movable jaw thereof when the grip is rotated, and connected with the carrier by a spring connection whereby said cam can yield to accommodate stems of various thicknesses, substantially as described.

10. The combination with stemming devices, of a guide, an endless chain having a portion adapted to travel through said guide, grip-carrying blocks carried by said chain and provided with portions for engaging the said guide, grips mounted revolubly in said blocks, provided each with a fixed and a movable jaw, a cam secured to each block, in position to engage and close the movable jaw of its grip, when the grip is rotated, means for rotating said grips and means for driving said chain, substantially as described.

11. The combination with stemming devices, of a grooved guide, an endless chain composed of separable links, having a portion adapted to travel through said guide, a series of grip-blocks, each provided with a link, forming part of said chain, and a part engaging said guide, a grip secured to each of said grip-blocks, means for opening and closing said grips and means for driving said chain, whereby said grip-blocks and grips may be inserted in said chain at any desired interval, substantially as described.

12. The combination with stemming devices, of an endless moving carrier, provided with a series of grips, means for opening and closing said grips, an auxiliary device for feeding leaves singly to said grips while they are in open position, operating mechanism therefor, and a part secured to said carrier, in a determined relation with each of said grips, for actuating said operating mechanism, substantially as described.

13. The combination with stemming devices, of an endless moving carrier, provided with a series of grips adjustably connected thereto, whereby they may be arranged at different intervals on said carrier, an auxiliary feeding device for feeding the leaves singly to said grips, means for opening and closing said grips, operating devices for said auxiliary feeding device, and a part adjustably secured to said carrier, in a determined relation to each grip, for actuating said operating devices, substantially as described.

14. The combination with stemming devices, of a grooved guide, an endless chain composed of separable links, having a portion adapted to travel through said guide, a series of grip-blocks, each provided with a link, forming part of said chain, and a part engaging said guide, a grip secured to each of said grip-blocks, means for opening and closing said grips and means for driving said chain, whereby said grip-blocks and grips may be inserted in said chain at any desired interval, an auxiliary feeding device for said grips operating devices therefor and blocks provided with links forming part of the chain, with parts to engage said guide and having parts to engage and actuate the operating devices for the auxiliary feeding device, substantially as described.

15. In a stemming-machine, the combination with the stemming-tube and means for creating a current of air therethrough, of a rotary knife-shaft and a knife located thereon, adjacent to the stemming-tube and comprising a pair of hubs, provided with radial recesses, and a series of blades located in the recesses of both hubs, each blade being provided with a recess to receive the stems of the leaves, substantially as described.

16. In a stemming-machine, the combination with the stemming-tube and means for creating a current of air therethrough, of a rotary knife-shaft and a knife located thereon adjacent to the stemming-tube and comprising a pair of hubs, provided with radial recesses, and a series of blades located in the recesses of both hubs, each blade being provided with a U-shaped recess, to receive the stems of the leaves, substantially as described.

17. In a stemming-machine, the combination with the stemming-tube and means for creating a current of air therethrough, of a rotary knife located adjacent to the stemming-tube and provided with a series of radial blades, each provided with a U-shaped recess to receive the stems of the leaves, substantially as described.

18. The combination with stemming devices, of an endless carrier, provided with a series of grips, means for driving said carrier, means for opening and closing said grips, a hopper provided with devices for supporting the leaves, a revoluble reel, provided with projections for engaging said leaves and feeding them to the grips, and mechanism for imparting an intermittent movement to said reel, substantially as described.

19. The combination with stemming devices, of an endless carrier provided with a series of grips, means for driving said carrier, means for opening and closing said grips, a hopper provided with devices for supporting the leaves, a revoluble reel, provided with projections for engaging said leaves and feeding them to the grips, and mechanism for imparting an intermittent movement to said reel, a slowly-moving feeding apron or conveyer, and a rapidly-moving apron or conveyer interposed between the slowly-moving conveyer and said hopper, substantially as described.

In testimony whereof we affix our signatures in the presence of two witnesses.

CHARLES R. SPENCER.
LOUIS P. WHITAKER.

Witnesses:
GEO. E. TAYLOR,
WM. SPEHNKOUCH.